(12) United States Patent
Bennett

(10) Patent No.: US 7,360,769 B2
(45) Date of Patent: Apr. 22, 2008

(54) SEALING ARRANGEMENT

(75) Inventor: Stephen P. Bennett, Bristol (GB)

(73) Assignee: Rolls-Royce, PLC, London (GB)

( * ) Notice: Subject to any disclaimer, the term of this patent is extended or adjusted under 35 U.S.C. 154(b) by 0 days.

(21) Appl. No.: 11/636,582

(22) Filed: Dec. 11, 2006

(65) Prior Publication Data

US 2007/0158919 A1    Jul. 12, 2007

(30) Foreign Application Priority Data

Jan. 12, 2006    (GB)    ................. 0600641.5

(51) Int. Cl.
*F16J 15/12*    (2006.01)
(52) U.S. Cl. ................ 277/641; 277/644; 277/653
(58) Field of Classification Search ........... 277/641, 277/644, 648, 649, 653
See application file for complete search history.

(56) References Cited

U.S. PATENT DOCUMENTS

| | | | |
|---|---|---|---|
| 4,379,560 A | 4/1983 | Bakken | |
| 4,537,024 A | 8/1985 | Grosjean | |
| 5,158,430 A * | 10/1992 | Dixon et al. | 415/134 |
| 5,639,100 A * | 6/1997 | Garrigues et al. | 277/614 |
| 6,431,825 B1 | 8/2002 | McLean | |
| 6,857,849 B2 * | 2/2005 | Hirst | 415/135 |
| 2002/0140184 A1 * | 10/2002 | Janoff et al. | 277/644 |
| 2004/0240986 A1 | 12/2004 | Burdgick | |
| 2006/0038358 A1 * | 2/2006 | James | 277/641 |

FOREIGN PATENT DOCUMENTS

| | | |
|---|---|---|
| GB | 1 580 884 | 12/1980 |
| GB | 2 385 642 A | 8/2003 |

* cited by examiner

*Primary Examiner*—Alison K Pickard
(74) *Attorney, Agent, or Firm*—Oliff & Berridge, PLC

(57) ABSTRACT

A sealing arrangement, for example between adjacent nozzle guide vane platform segments (2A, 2B) in a gas turbine engine, comprises a seal (12) which extends across a gap (13) between the platform segments (2A, 2B) and engages, at opposite ends, in grooves (8A, 8B). The seal (12) comprises a web element (14) having recesses (20A, 20B) at its opposite edges, which receive sealing elements (16A, 16B). The sealing elements (16A, 16B) may comprise a braided amorphous silica yarn or other filamentary temperature-resistant material.

13 Claims, 1 Drawing Sheet

SEALING ARRANGEMENT

This invention relates to a sealing arrangement, and is particularly, although not exclusively, concerned with a sealing arrangement that is suitable for use to provide a seal between adjacent components of a gas turbine engine.

A gas turbine engine may comprise many gaps between adjacent components that must be sealed to prevent or restrict gas flow through the gaps. For example, a nozzle guide vane annulus may comprise segments, each comprising one or more nozzle guide vanes extending between inner and outer platforms, which are assembled together to form the complete annulus. It is known for the end faces of the platforms to be provided with grooves, and for sealing elements to be placed in the grooves to extend across the gap between adjacent segments.

Over the operating cycle of an engine, thermal, centrifugal and other effects can cause relative movement between adjacent components of a gas turbine engine, and consequently the sealing arrangements that are used must be capable of accommodating this movement.

It is known, for example from U.S. Pat. No. 4,379,560, for gaps between gas turbine engine components to be sealed by means of seals in the form of webs which extend between the components and which have enlarged edge portions which are accommodated in grooves in the components. The seals, including the enlarged edge regions, may be made from a metallic material.

To ensure adequate sealing, the enlarged edge regions and the grooves must be made to close tolerances, and must be provided with a high quality surface finish. Wear or other degradation of the seal can result in gas leakage, which can result in a loss of performance of the engine. Sealing problems are particularly acute if the seal has to fit in a curved groove.

According to the present invention there is provided a sealing arrangement between first and second components arranged side by side comprising a first component formed with a groove which opens towards the second component, a second component formed with a groove which opens towards the first component, and a seal member which extends between the components comprising a web element having a first side thereof located in the groove in the first component, and a second side opposite the first side located in the groove in the second component, the seal element being formed with a first recess along the first side and a second recess along the second side, and compressible sealing elements located in each of the first and second recesses such that said compressible sealing elements make sealing engagement with the interior of the grooves in the first and second components.

Each sealing element may have an exposed surface that makes direct contact with a surface of the respective groove. Each sealing element and the respective recess may have shapes which cooperate to retain the sealing element in the recess. Alternatively, or in addition, each sealing element may be bonded into the respective recess.

One or both of the sealing elements may have a generally cylindrical cross-section when uncompressed, and the respective recess may have a complementary cylindrical shape. In an alternative embodiment, one or both of the sealing elements may have a flat exposed surface, when uncompressed, for engagement with a flat surface of the respective groove.

Because the material of the sealing elements is compressible, they are able to maintain sealing contact across opposite wall surfaces of the respective grooves. On assembly, the sealing elements may be lightly compressed. Various compressible materials may be suitable for use as the sealing elements. For use in gas turbine engines, it will normally be necessary for the sealing elements to be resistant to high temperatures, and the material of the sealing elements must be selected accordingly.

At least one of the sealing elements may comprise a bundled yarn, for example a braided yarn. In the context of this specification, the expression "bundled yarn" is to be interpreted broadly to embrace any form of elongate flexible element made up of a plurality of individual fibres, including bulk or randomly disposed fibres, knitted, woven or braided fibres or yarns, or twisted fibres or yarns in the form of rope or cord.

The fibres of the sealing element may be made from a temperature-resistant material, for example a material capable of withstanding temperatures in excess of 900° C. or even 1200° C. or 1500° C. The sealing element may consist predominantly of amorphous silica yarn, for example it may comprise at least 90% silica, and preferably at least 93% or 99% silica.

The web element is preferably made from a metallic material, for example steel, and it may be made from a relatively resilient material, such as spring steel. The material of the web element is preferably sufficiently flexible to enable the seal to adapt to a curved groove. For example, if the web element is made from steel, the web element preferably has a thickness less than 1 mm, more preferably less than 0.5 mm.

The web element may be formed by deformation of a flat sheet, for example by stamping, rolling or extrusion, to provide the recesses.

In a sealing arrangement in accordance with the present invention, the compressible sealing elements may provide an adequate sealing effect within the grooves, even without a high quality finish on the groove surfaces. Consequently, adequate sealing may be achieved with the grooves left in their as cast condition, enabling economies to be achieved in the manufacture of the components.

For a better understanding of the present invention, and to show more clearly how it may be carried into effect, reference will now be made, by way of example, to the accompanying drawings, in which.

Figure 1:
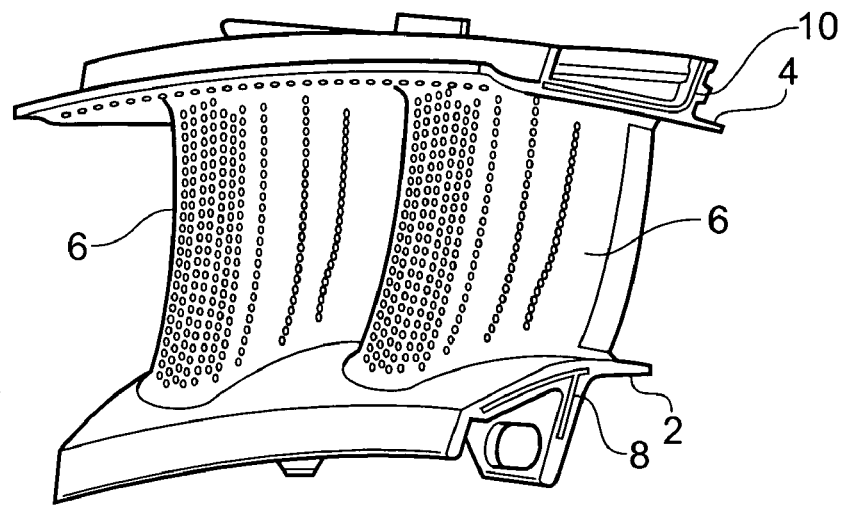
FIG. 1 shows a nozzle guide vane segment including inner and outer platform segments.

The nozzle guide vane segment shown in FIG. 1 has radially inner and outer platform segments 2, 4 between which extend two nozzle guide vanes 6. The nozzle guide vane segment shown in FIG. 1 is assembled for use with other identical segments to form a complete annulus. In operation of the engine, hot gas flows past the nozzle guide vanes 6 between the platforms 2, 4 while cooling air flows over the outer surfaces (ie the surfaces away from the vanes 6). It is desirable to avoid leakage of the hot gas flowing over the vanes 6 through the gaps between adjacent segments, since this will heat the cooling air so reducing the cooling effect. Similarly, it is desirable to prevent leakage of the cooling air into the hot gas flow, since this will reduce the efficiency of the engine.

To prevent such leakage, a sealing arrangement is provided between adjacent platform segments. For this purpose, receiving grooves, generally indicated at 8 in the figures of the drawings, are formed in the end faces of the radially inner platform segments 2. Further receiving grooves 10 are provided in the end faces of the outer platform segments 4. Seals 12 (see FIG. 2) extend across the gaps 13 between the confronting edges of adjacent platforms 2, 4, with edge regions of the seals 12 accommodated in the receiving grooves 8, 10.

Figure 2:
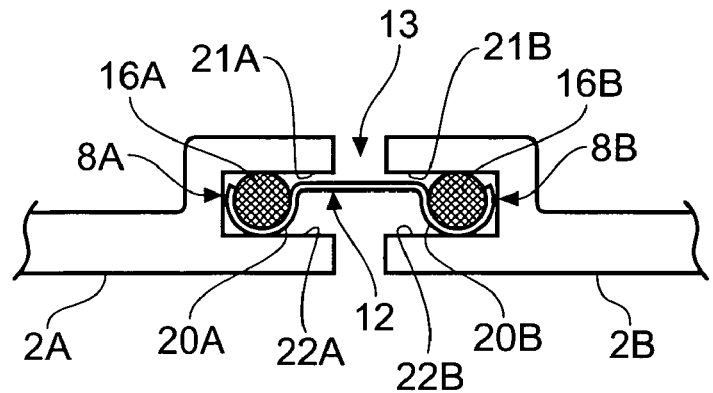
FIG. 2 shows a sealing arrangement between two adjacent platform segments.
Figure 3:
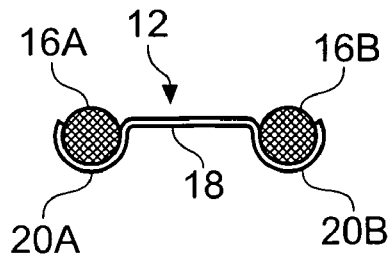
FIG. 3 shows a seal of the sealing arrangement of FIG. 2.
Figure 5:
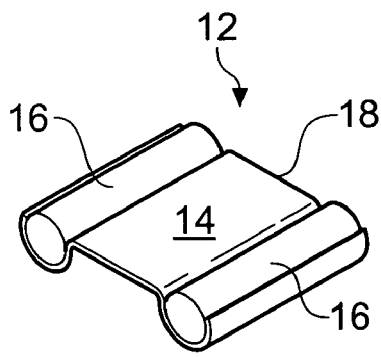
FIG. 5 shows a portion of the seal of FIG. 3.

FIG. 2 shows in greater detail the sealing arrangement between adjacent inner platform segments 2A, 2B. It will be understood a similar sealing arrangement is provided between adjacent outer platform segments 4. As shown in FIGS. 2, 3 and 5, a seal 12 comprises a web element 14 provided at opposite edge regions with sealing elements 16A, 16B. The web element 14 comprises a flat central region 18 and recesses 20A, 20B along two sides spaced apart at opposite edges to receive the sealing elements 16A, 16B respectively. In most examples of such a seal the web element 14 is elongate, or rectangular, with the recesses 20A, 20B are formed along the longer edges of the central portion 18.

In the embodiment shown in FIGS. 3 and 5, the sealing elements 16A, 16B, when uncompressed, have a circular cross-section, and the recesses 20A, 20B have a complementary part-circular internal shape. The web element 14 may be formed from a flat strip of material, for example thin steel strip, which is extruded, stamped or otherwise shaped, to provide the recesses 20A, 20B. The material of the web element 14 may be resilient, so that the central web region 18 can flex in the event of relative movement between the nozzle guide vane segments, and to provide resilient entrapment of the sealing elements 16A, 16B within the recesses 20A, 20B. It will be appreciated that the material of the web element 14 that forms the recesses 20A, 20B extends around the sealing elements 16A, 16B by more than half of their periphery, so that the sealing elements 16A, 16B are retained within the recesses 20A, 20B. The sealing elements 16A, 16B may be bonded into the recesses 20A, 20B by means of a suitable adhesive. In some circumstances, bonding alone may be used to retain the sealing elements 16A, 16B in the recesses 20A, 20B, in conjunction with the retaining effect provided by the grooves 8A, 8B after the seal 12 has been assembled with the nozzle guide vane segments 2A, 2B.

When a seal 12 is inserted into the grooves 8A, 8B, the sealing elements 16A, 16B are lightly compressed against one side 21A, 21B of the grooves 8A, 8B. Consequently, the outer surfaces of the recesses 20A, 20B are also urged into contact with the opposite sides 22A, 22B of the grooves 8A, 8B thereby providing sealing contact.

Sealing contact is thus maintained even if the components 2A, 2B move relatively to each other, or if some enlargement occurs due to wear between the parts of the seal 12 and the groove walls 21A, 22A, 21B, 22B.

Figure 4:
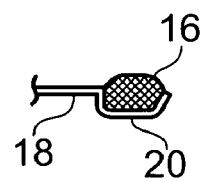
FIG. 4 shows an alternative form of seal.

FIG. 3 shows the seal 12, with circular section sealing elements 16A, 16B in an uncompressed shape. As shown in FIG. 4, a sealing element 16 may have a natural shape other than circular. For example, when uncompressed it may have a flattened face 20 in order to increase the contact area between the sealing element 16 and the corresponding surface 21 of a groove 8. Preferably the sealing elements are made of material capable of withstanding the high temperatures encountered within a gas turbine engine, although if the seals are used in a less demanding environment a temperature capability may not be necessary. For use in a gas turbine engine, each sealing element 16 is made from a bundle of fibres of amorphous silica material. The fibres may be held together by any suitable means, but in a preferred embodiment yarns are formed from the fibres, the yarns being braided together to form a cord- or rope-like element. A suitable material is available under the name REFRA-SIL®. The sealing element may be provided with an abrasion-resistant or lubricating coating.

The seal 12 may be provided as a continuous length that can be cut to size for any particular groove 8 or 10 (FIG. 1). It will be appreciated that the grooves 8 and 10 have curved regions, and the thickness of the material of the web element 14 may be selected so as to enable the seal 12 to follow the curves of the grooves 8 and 10.

Although the seal 12 has been described in the context of a seal assembly between platform segments in a nozzle guide vane annulus, it will be appreciated also that a sealing arrangement in accordance with the present invention may be employed in other assemblies of a gas turbine engine, or in non-gas turbine applications.

The invention claimed is:

1. A sealing arrangement for sealing a gap between relatively movable first and second components arranged side by side with the gap between them, the arrangement comprising a groove formed in the first component which opens towards the second component, a groove formed in the second component which opens towards the first component, and a seal member which extends between the components comprising a metal web element having a first side edge thereof located in the groove in the first component, and a second side edge opposite the first side located in the groove in the second component, the web element is formed with a first recess along the first side edge and a second recess along the second side edge, and with compressible sealing elements in the form of cord or rope-like elements of temperature-resistant material located in the first and second recesses such that said temperature-resistant compressible sealing elements make sealing engagement with one side of the interior of the grooves in the first and second components and metallic material of the web element makes contact with an opposite side of the interior of the grooves.

2. A sealing arrangement as claimed in claim 1, in which each compressible sealing element is located in a respective groove with its surface partly exposed so that, in operation, the exposed surface of the element directly contacts an interior of the surface of the respective groove.

3. A sealing arrangement as claimed in claim 2, wherein at least one sealing element and a respective recess have cooperating shapes which cause the sealing element to be retained in the recess.

4. A sealing arrangement as claimed in claim 1, wherein at least one sealing element and a respective recess have cooperating shapes which cause the at least one sealing element to be retained in the respective recess.

5. A sealing arrangement as claimed in claim 1, wherein at least one sealing element is bonded into a respective recess.

6. A sealing arrangement as claimed in claim 1, wherein at least one sealing element has a generally circular cross-section when uncompressed.

7. A sealing arrangement as claimed in claim 1, wherein at least one sealing element has a flat surface, when uncompressed, which engages a respective groove surface.

8. A sealing arrangement as claimed in claim 1, wherein at least one sealing element comprises a bundled yarn.

9. A sealing arrangement as claimed in claim 8, wherein the at least one sealing element further comprises a braided yarn.

10. A sealing arrangement as claimed in claim 9, wherein the sealing at least one element is made from a material which predominantly comprises amorphous silica yarn.

11. A sealing arrangement as claimed in claim 8, wherein the at least one sealing element is made from a material which predominantly comprises amorphous silica yarn.

12. A sealing arrangement as claimed in claim 1, wherein at least one sealing element is made from a material capable of withstanding a temperature in excess of 900° C.

13. A sealing arrangement as claimed in claim 1, wherein the web element is made from steel strip.

* * * * *